F. E. SPERRY.
LOCKING DEVICE FOR CHANGE SPEED GEARING.
APPLICATION FILED SEPT. 18, 1913.
1,124,545.
Patented Jan. 12, 1915.
3 SHEETS—SHEET 3.
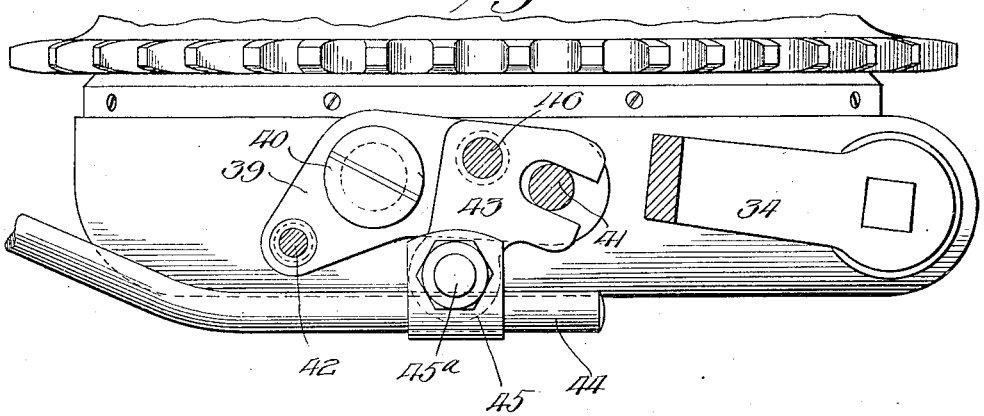
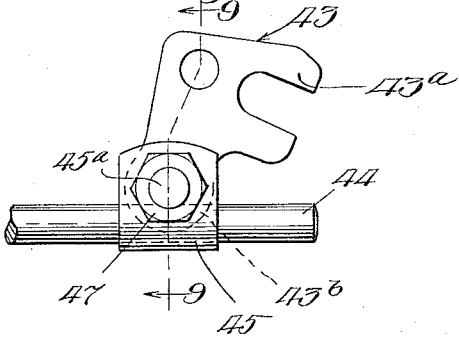
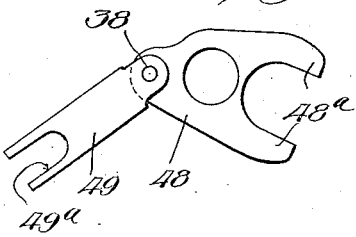
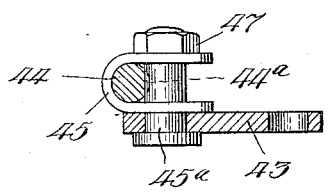

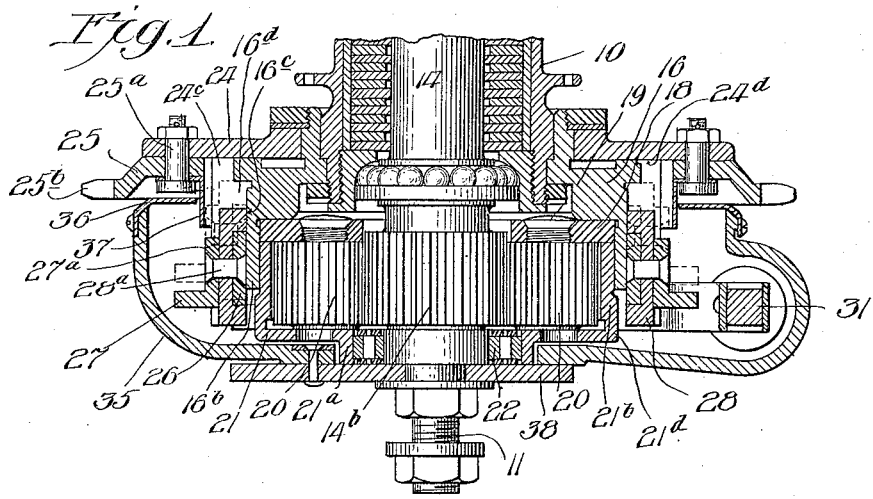

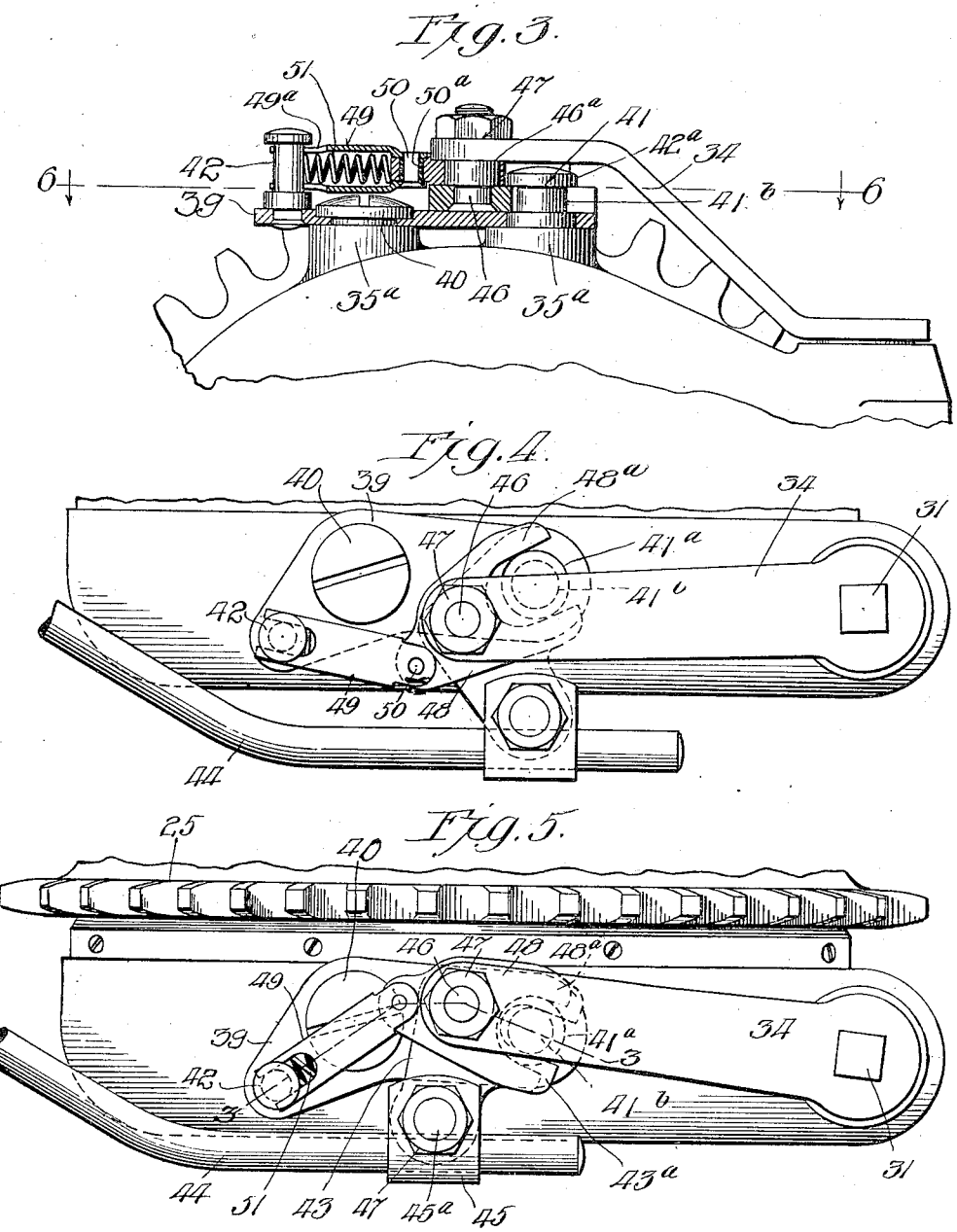

UNITED STATES PATENT OFFICE.

FRANK E. SPERRY, OF AURORA, ILLINOIS, ASSIGNOR TO AURORA AUTOMATIC MACHINERY COMPANY, OF CHICAGO, ILLINOIS, A CORPORATION OF DELAWARE.

LOCKING DEVICE FOR CHANGE-SPEED GEARING.

1,124,545.          Specification of Letters Patent.      Patented Jan. 12, 1915.

Application filed September 18, 1913. Serial No. 790,530.

*To all whom it may concern:*

Be it known that I, FRANK E. SPERRY, a citizen of the United States, and a resident of Aurora, in the county of Kane and State of Illinois, have invented certain new and useful Improvements in Locking Devices for Change-Speed Gearing; and I do hereby declare that the following is a full, clear, and exact description thereof, reference being had to the accompanying drawings, and to the letters of reference marked thereon, which form a part of this specification.

This invention relates to improvements in locking devices and more particularly in locking devices adapted for use in connection with change speed gearing devices or similar devices for motor vehicles.

The purpose of my invention is to provide a construction for a locking device to be applied to devices of the class hereinbefore mentioned and which is illustrated and hereinafter described in connection with such a device as is fully set forth in an application entitled "Change speed gearing," filed by me in the United States Patent Office on the 26th day of August 1912 and bearing Serial No. 717,109.

A change speed gearing device, such as shown in my before mentioned application, is mounted upon the rear axle of a motor cycle or similar vehicle and is operated by a suitable shifting lever located some distance forward of the said rear axle, and a rod or like element connecting the said control lever and change speed gearing device. The distance between the two elements is such that a positive and quick acting movement can not be transmitted from the control lever to the change speed mechanism owing to the flexibility of the connecting element, the lost motion which is necessarily present in the several parts, and the rotation of the gears embodied in the change speed mechanism.

My invention has for its purpose the elimination of these difficulties, by assisting the control lever in its operation of the change speed device, imparting a positive movement to the shifting element of the change speed gear, and acting to increase the speed of movement of the said shifting element in changing from one speed to another. In addition to these features it further acts as a means of locking the shifting element of the change speed mechanism in the position to which it has been shifted, preventing the same from any undesired movement by reason of the rotative movement of the elements of the change speed mechanism or the vibration of the vehicle.

Referring to the drawings—Figure 1 is a view in cross-section of the change speed gearing device to which the locking device is applied; Fig. 2 is a view in vertical section of the change speed device, showing the locking device in side elevation, with clamp and control rod removed; Fig. 3 is a view in side elevation of the upper portion of the change speed gear device with the locking device in cross-section, taken on line 3—3 of Fig. 5; Fig. 4 is a fragmentary plan view of the device showing the positions of the parts thereof when the change speed gearing is driving at low speed; Fig. 5 is a similar view of the change speed gear showing positions of the parts thereof when change speed gear is driving at high speed; Fig. 6 is a view in cross-section, taken on line 6—6 of Fig. 3; Fig. 7 is a detail view of lever, clamp and control rod removed from the device; Fig. 8 is a detail view of the toggle lever removed from the device; Fig. 9 is a cross-sectional detail view, taken on line 9—9 of Fig. 7.

Referring to the drawings, an understanding of the operation of the change speed device to which the locking device is applied will be obtained from the following description.

The form of a change speed device shown in the accompanying drawings embraces as its principal parts a non-rotative bearing member, a primary driven member, a driving member, and a clutch mechanism adapted to lock the driving member to either the primary or intermediate driven member. As illustrated in said drawings, the non-rotative bearing member embraces an axle 11, and a tubular member or sleeve 14 surrounding one end of said axle, and provided with external gear teeth 14$^b$. The axle 11 and sleeve 14 are rigidly affixed to the frame of the vehicle. The axle 11 shown is the rear axle of a motor-cycle and is adapted for attachment to the frame of such a motor-cycle, in a manner familiar to those skilled in the art. The primary driven member is adapted to turn or rotate on the said non-rotative bearing member and embraces a tubular part or hub shell 10, an annular body member 16, which surrounds and is rigidly attached to one end of said hub shell, and a stud-carrying ring 18 rigidly attached to the body member 16 concentrically with same. Said ring 18 is provided with a plurality of rigidly attached studs 19, 19, extending from the outer side of said ring parallel with the central axis of the device, and carrying a plurality of pinions 20, 20, which intermesh with the gear teeth 14$^b$ on the sleeve 14. The hub shell 10, one end only of which is shown, constitutes the rear hub of a motor-cycle, to which the wheel spokes are attached. Said hub shell is mounted concentrically with the axle 11, and is supported at its opposite ends by suitable bearings. In the drawings, one only of such bearings is shown, the same being located between the end of the hub shell 10 and the sleeve 14, as hereinafter more particularly described.

The intermediate driven member consists of an internal gear wheel 21, having a hub 21$^a$, which is mounted and turns on an annular roller bearing interposed between said hub 21$^a$ and the fixed sleeve 14 outside of the gear teeth thereon, and the rim of which has the form of a cylindric ring 21$^b$, which extends toward the body member 16 and surrounds the pinions 20, 20. Said gear wheel 21 is provided with internal gear teeth formed on the inner face of the ring 21$^b$ and engaging the said gear pinions 20, 20.

The driving member consists of an annular member or apertured disk 24 which is mounted and is adapted to turn upon the body member 16 and has attached to its outer margin, by means of bolts 25$^a$, a ring 25 provided with a series of sprocket teeth 25$^b$, the parts 24 and 25 together forming a sprocket wheel. Said sprocket wheel is adapted to receive a sprocket chain (not shown) by which the rotary motion is transmitted from an engine or motor to the driving member.

The clutch mechanism embraces, in general, features of construction as follows: The annular body member 16 is provided with a peripheral flange 16$^b$, extending outwardly from the inner face of said body member, and partially surrounding the rim 21$^b$ of the intermediate driven member 21. Said flange 16$^b$ is provided with a series of notches 16$^c$ forming a plurality of radially extending lugs or locking projections 16$^d$. The cylindric rim or gear-ring 21$^b$ of the intermediate driven member or gear wheel 21 is provided on its outer surface with an outwardly extending, annular flange 21$^d$ provided with a plurality of notches 21$^e$ forming a series of radial projections or locking teeth 21$^f$, located at the outer margin of the ring 21$^b$, and exterior to the outer margin of the annular flange 16$^b$ on the body member 16. The driving member, or sprocket wheel 24, is provided on its outer face with an annularly arranged set or series of segmental arms 24$^c$, which extend laterally therefrom radially outside of the body member 16 and the gear wheel 21. Said arms 24$^c$ are spaced radially from the cylindric outer face of the body member 16 and its annular flange 16$^b$, and are adapted to form between them a series of guide slots 24$^d$, extending longitudinally of, or parallel with the central axis of the device. In addition to the parts described, the clutch mechanism embraces an axially movable or sliding clutch ring 26, which surrounds and slides laterally on the cylindric outer surface of the body member 16 and its flange 16$^b$, and is located in the space between said body member and the segmental arms 24$^c$ of the sprocket wheel 24. The device shown for giving sliding movement to or actuating said clutch ring will be hereinafter described. Said clutch ring 26 carries a series of keys 28, 28, which are attached to and move with said clutch ring. Said keys are fitted between the arms 24$^c$, 24$^c$ of the sprocket wheel 24, and slide in the slots 24$^d$, between said arms, in the direction of the central axis of the device. The inner ends of said keys are adapted to enter the notches 16$^c$ and to thereby engage the locking keys or teeth 16$^d$ on the body member 16 of the primary driven member. The outer or forward ends of the said keys are adapted to enter the notches 21$^e$, and to thereby engage the locking lugs or teeth 21$^f$ on the gear wheel or intermediate driven member 21; the keys 28, 28 being constantly engaged between or with the arms 24$^c$ on the sprocket wheel 24. The said keys, together with the clutch ring 26, turn or rotate with said sprocket wheel, and when said clutch ring and the keys are shifted, the keys act to connect or lock the said sprocket wheel either to the body 16 of the primary driven member, or to the gear wheel 21, constituting the intermediate driven member. When the said sprocket wheel 24 is locked to the body member, the hub 10 and the wheel of the vehicle are locked to and turn with the said sprocket wheel. When the said sprocket wheel is released from the body member 16, and locked to the gear wheel 21, the latter turns with the sprocket wheel, and by reason of its geared connection with the pinions 20, 20, and the geared connection of said pinions with the non-rotative sleeve 14, said pinions are carried bodily around the said sleeve 14, thereby effecting rotative movement of the body member on which said pinions are mounted.

The body member and hub are then rotated at a rate of speed slower than that of the sprocket wheel, with a corresponding increase in the turning moment transmitted to the wheel hub and the vehicle wheel.

Now referring more in detail to the construction of the means for operating the clutch mechanism, the same embrace features of construction as follows: The clutch ring 26 (Fig. 2) with which the keys 28 are connected has attached to it an outer ring 27 which surrounds the arms 24$^c$. The outer clutch ring has its inner surface spaced from the outer surface of the arms 24$^c$ and is provided with a plurality of inwardly extending lugs 27$^a$, corresponding in location with the keys 28, and extending inwardly into contact with said keys. Each of said keys 28 is provided in its inner face with a notch of a depth and width sufficient to receive the inner clutch ring 26 so that the interior surfaces of said keys 28 and the inner ring 26 are flush with each other, as seen in Fig. 1. The inner ring 26 and the outer ring 27 are rigidly held together by means of radially arranged rivets 28$^a$ passing through the inner ring 26, the keys 28, and the lugs 27$^a$ on said outer ring 27. By this construction the clutch ring 26 is adapted to slide between the flange 16$^b$ of the body member 16 and the arms 24$^c$ on the sprocket wheel member 24, while the keys 28 rest in the slots between said arms 24$^c$, and the outer ring 27 is exterior to and free from contact with said arms 24$^c$, as clearly seen in Fig. 2. The keys 28 project at their ends from the clutch ring 26 and outer ring 27 toward the disk 24 and are adapted, when the clutch ring is shifted inwardly, to enter or engage the notches 16$^c$ between the lugs or teeth 16$^d$ on the body member 16. The outer projecting ends of the keys 28 extend laterally from said rings 26 and 27 and are adapted to engage the notches 21$^e$ of the gear wheel 21, when said rings 26 and 27 are shifted outwardly on or relatively to the arms 24$^c$. The shifting movement of said clutch rings 26 and 27 is accomplished by means of shifter blocks 29 (see Fig. 2) arranged diametrically opposite each other and which straddle the outer ring 27. Said shifter blocks 29 are rigidly attached to a shifter yoke 30, rigidly secured to a square shaft 31 extending at right angles to the central axis of the device and pivoted at its ends in fixed bearings 32, 32. Said shifter yoke is additionally supported by means of a brace 33 riveted at either extremity to the shifter yoke 30 and at its central portion to the pivot shaft 31. To the upper extremity of said pivot shaft 31 is rigidly attached a shifting lever arm 34 hereinafter referred to in detail.

The entire mechanism, with the exception of the driving member or sprocket wheel and the operating levers for the clutch ring, is inclosed within a metallic housing 35, having a vertical front or outer wall arranged parallel with and outside of the gear wheel 21, and a marginal wall which extends inwardly to the outer face of the sprocket ring 25, and so constructed as to be oil and dust proof. The mechanism is protected by dust rings 36 and 37 (Fig. 1), one of which, the outer dust ring 36, is attached to the inner margin of the housing 35 and extends radially inward therefrom and substantially meets the flange and an inner dust ring 37 mounted upon the sprocket ring 25 by means of the bolts 25$^a$.

The non-rotative sleeve 14 is held from rotating by means of a vertical plate 38 provided centrally with a flat sided hole adapted to engage a square shoulder formed upon the outer end of the said sleeve 14, thus preventing the rotation of said sleeve relative to the said plate 38. Said plate 38 is removably secured to the frame of the vehicle thus preventing the same from being rotated.

To drive at the low speed the clutch ring 26 is shifted to the position shown in Fig. 1, in which position the keys 28 of the said clutch ring engage both the slots between the arm 24$^c$ of the sprocket support 24 and the teeth 21$^f$ of the gear wheel or intermediate driven member 21. At this time said keys are disengaged from the clutch teeth 16$^d$ of the primary driven member 16. The clutch ring therefore acts to lock the intermediate driven member to the sprocket wheel or driving member so that they rotate together. The internal gear of the intermediate driven member, meshing with the pinions, gives said pinions rotation about their shafts and also, since said pinions mesh with the gear teeth 14$^b$ of the non-rotating sleeve 14, the pinions are forced to rotate about the said non-rotative bearing member 14. The pinion studs 19, the stud bearing plate 18, and the central body support 16, being rigid with the hub shell 10, the rotative motion of the pinions about the non-rotative bearing member 14 is transmitted directly to the said hub shell 10 and thence to the vehicle wheel. If it is desired to change from the low to the high speed, it is necessary to disengage the intermediate driven member from the driving member and to lock the primary driven member directly to the driving member, and by so doing transmit rotative motion directly from the driving member to the hub shell 10. This is done by shifting the clutch ring to its outer extreme position, as shown in Fig. 1. The change of speed, however, does not take place immediately, for during the initial movement of the clutch ring the keys of the clutch ring are disengaged from the locking teeth of the intermediate driven member. The clutch ring and its keys are then brought to a neutral position, in which no power is transmitted, because the driving member and the driven members are disconnected. When the locking teeth of the intermediate driven member are disengaged from the keys there takes place a relative rotation between the sprocket member and the primary driven member which brings the locking notches of the latter opposite the clutch teeth of said driven member. The shifting power exerted upon the clutch ring being constant, the keys of said clutch ring will slip into the oppositely arranged slots and notches, thus clutching the primary driven member to the driving member and a direct transmission of power will then be effected from the driving member to the primary driven member.

Referring now to the construction of the locking device embodied in my invention and its connection with the change speed device, the shifting lever 34 before mentioned as mounted upon the upper extremity of the shaft 31 is bent upwardly and extends above the housing 35 of the change speed device, and terminating between the forward and rear portions thereof. The said housing is provided upon its upper surface with a plurality of upright lugs 35ᵃ. A plate 39, constituting the bed or supporting means of the locking device, is rigidly secured in horizontal position upon said lugs in the following manner: A screw 40, having a large flat head, extends through one end portion of the plate and has screw-threaded engagement with one of said lugs. Through an aperture formed at the other end portion of said plate extends a stud 41 rigidly secured in the other of said lugs 35ᵃ. The said stud 41 is provided with a head 41ᵃ at a short distance above the surface of the plate 39, and a reduced cylindric portion 41ᵇ between the surface of the said plate and the head. The end portion of the plate 39 adjacent to the screw 40 extends beyond said screw at a slight angle to the central axis of the plate. Rigidly mounted upon this extended portion of the plate is a stud 42 projecting upward from the plate and located at a point laterally offset from a line passing through the axes of the screw 40 and stud 41. Mounted upon the plate is a lever 43 (Fig. 7), comprising two arms 43ᵃ and 43ᵇ arranged substantially 90° apart. One of said arms 43ᵃ is provided with a forked extremity which constantly engages the reduced portion 41ᵇ of the stud 41, said stud thereby acting as a fulcrum or pivoting point about which the lever turns. At the extremity of the other arm 43ᵇ is attached a control rod 44, by means of which the change speed device is operated. The said control rod is actuated by means of a suitable control lever mounted upon the frame of the vehicle at a point easily accessible to the operator and transmits an endwise movement to the rod. The connection between the said rod 44 and the arm 43ᵇ of the lever 43 consists of a clamp 45 which is tightened by means of a bolt 45ᵃ to securely grip the rod. The control rod is preferably provided with a notch 44ᵃ (Fig. 9) adapted to be engaged by the bolt 45ᵃ, thereby preventing endwise movement of the rod within the clamp. The said bolt also extends through the arm 43ᵇ of the lever and arranged to admit of a pivotal connection between the said lever and clamp. At a point located approximately at the intersection of the center lines of said arm 43ᵃ and 43ᵇ of the lever 43, is an upwardly projecting bolt 46 having rigid connection at its lower end with the said lever. Immediately above the upper surface of said lever the bolt 46 is provided with an enlarged portion 46ᵃ forming a cylindric bearing surface, the purpose of which will hereinafter be described. The upper extremity of the bolt extends through an aperture in the adjacent extremity of the shift lever 34, which engages and bears downwardly upon a shoulder formed by the said enlarged portion 46ᵃ. The bolt is provided at its upper end with screw threads which engage a nut 47 mounted upon the stud and acting to hold the shift lever in place at the same time permitting the stud to turn within the aperture of the shift lever. The remaining element of the device is a toggle lever, comprising two members, to wit, a yoke 48 and a sleeve 49 pivotally connected together (Fig. 8). The yoke 48 is mounted upon the bolt 46 to turn about the cylindric bearing surface of the enlarged portion 46ᵃ and is interposed between the shift lever 34 and the lever 43. Said yoke is provided with a forked portion, the arms 48ᵃ, 48ᵃ of which embrace the head 41ᵃ of the stud 41, which acts as a fulcrum for said yoke. The sleeve 49 is pivotally connected with said yoke by means of a pin 50 which extends through the adjacent end of the sleeve and the yoke, said point of connection being located adjacent to the stud 46, and on the opposite side thereof from the forked portion of the yoke. A bushing 50ᵃ is preferably provided within the aperture of the yoke through which extends the pin 50. The sleeve 49 is provided at its opposite extremity with a vertically arranged channel 49ᵃ extending inwardly from the end thereof, said channel being adapted to constantly engage the stud 42, in a manner such that the sleeve may turn about said stud and also to have an endwise movement relative thereto. A coiled compression spring 51 is inclosed within the sleeve 49 and bears against the stud at one of its extremities and against the adjacent portion of the sleeve at its opposite extremity. The action of this spring is such that a force is constantly exerted tending to force the sleeve in a direction away from the said stud 42 and along the axis of the sleeve, which force is transmitted to the yoke 48.

The operation of the locking device is as follows: Referring to Fig. 4, the shifting lever is shown at the extreme position of its movement in one direction in which position the change speed device is driving at the low speed. In this position also the toggle lever is flexed and the angle included by the axis of the sleeve 49 and a line passing through the pivot point of the toggle lever and the stud 46 is of such a magnitude that the spring exerts a force upon the stud 46 through the medium of the yoke 48 which holds or locks the shift lever in position, the arms 48$^a$ of the yoke acting to prevent any relative movement between the yoke and the bolt 46 by reason of their engagement with the head of the stud 41. To shift from the high speed to the low speed (Fig. 5), it being assumed that the vehicle is in movement, the control lever of the vehicle (not shown) is manipulated so that an endwise movement to the left is transmitted to the control rod 44. This movement is likewise transmitted to the lever 43, which is swung in a clockwise direction about the stationary stud 41 as a center. The shift lever is carried with the lever 43 to the other extremity of its movement, namely, to the low speed position. This movement of the lever 43 is accompanied by a similar swinging movement of the toggle lever, the yoke member 48 thereof being carried with the lever 43 by reason of its connection therewith through the medium of the bolt 46 and likewise turns about the stud 41, the head 41$^a$ of the same being engaged by the forked arms 48$^a$ of the yoke member. The sleeve 49 is simultaneously carried about the stud 42 as a center and by reason of its pivotal connection with the yoke member, the following conditions result: During the first part of the movement from the low speed position (Fig. 4) to the high speed position (Fig. 5), the yoke member 48 and the sleeve 49 will tend to approach the same straight line or to straighten out and an endwise movement of the sleeve 49 relative to the stud 42 will be effected by means of the engagement of the stud 42 within the channel 49$^a$ of the sleeve. Obviously the spring 51 within the sleeve will be compressed and the force exerted by it tending to oppose the movement of the shifting lever 34, is gradually increased until the toggle lever is straightened in which position the spring exerts its maximum compressive force. The straightened position of the toggle further corresponds to the neutral position of the shifting lever in which the driving and driven members of the change speed device are engaged. A further movement of the lever 43 carries the toggle lever beyond its straightened position, the same being flexed in the opposite direction. The maximum force of the spring is now exerted upon the said lever 43 in the direction of movement of the shifting lever 34, acting to carry the same without loss of time into position for driving at the high speed. The movement of the shifting lever effects the positive and rapid engagement of the elements of the change speed device by reason of the force exerted by the spring. The spring further acts to hold the shifting lever in the high speed position, thus preventing the driven and driving members from being improperly thrown out of engagement. The clamp 45, connecting the control rod 44 with the lever 43, is properly mounted to turn relatively to the said lever 43, thus allowing the rod 44 to assume parallel positions during the movement of the lever 43. To shift from the high to the low speed, the control rod is moved in the opposite direction and the locking mechanism acts in the manner as above described. It is at once apparent that the path of the bolt 46 is slightly eccentric relative to the stud 41, for which reason the engagement of the lever 43 and yoke 48, by means of the forked portions, is properly employed thereby permitting a slight endwise movement of the said lever and yoke, relative to the stud, which necessarily occurs simultaneously with their rotative movements about the same point.

The construction of the device may be variously modified in detail, without departing from the spirit of the invention, and I do not therefore wish to be limited to the features illustrated and herein described except in so far as set forth in the appended claims.

I claim as my invention:

1. In a device of the character described, the combination of a driving member, a driven member, a shiftable clutch member acting to engage and release said driving and driven members, a control rod operatively connected with said clutch member, and a toggle lever, embracing tension means acting through said toggle lever to move said shiftable clutch member into operative position and to lock the same in said operative position.

2. In a device of the character described, the combination of a driving member, a driven member, a shiftable clutch member acting to engage and release said driving and driven members, a shifting lever operatively connected with said clutch member, a control rod operatively connected with said shifting lever, and a toggle lever, embracing tension means acting to move said shifting lever into operative position and to lock the same in said operative position.

3. In a device of the character described, the combination of a driving member, a driven member, a shiftable clutch member acting to engage and release said driving and driven members, a control rod operatively connected with said clutch member, and a toggle lever operatively connected with said clutch member, embracing a spring acting on said toggle lever to move the clutch member into and out of operative position and to lock the same in its operative position.

4. In a device of the character described, the combination of a driving member, a driven member, a shiftable clutch member for engaging and releasing said driving and driven members, operating means connected with said clutch member, and a toggle lever operatively connected with said clutch member, comprising two pivotally connected members, one of said members having pivotal connection with said clutch member operating means, the other of said members having pivotal and endwise movement relative to a fixed point, and embracing a spring acting to assist the movement of said clutch member into operative position and to lock the same in said position.

5. In a device of the character described, the combination of a driving member, a driven member, a shiftable clutch member acting to engage and release said driving and driven members, a shifting lever connected with said clutch member, a control rod operatively connected with said shifting lever, and a toggle lever, embracing a spring acting on said toggle lever to move said shifting lever into and out of operative position and to lock the same in its operative position.

6. In a device of the character described, the combination of a driving member, a driven member, a shiftable clutch member for engaging and releasing said driving and driven members, a shifting lever operatively connected with said clutch member, a manually operable control rod, and a toggle lever connecting said shifting lever and control rod, comprising two pivotally connected members, one of said members having pivotal connection with said shifting lever and operatively connected with said control rod, the other of said members having pivotal and endwise movement relative to a fixed point, and embracing a spring acting to assist the movement of said shifting lever into its operative positions and to lock the same in said positions.

7. In a device of the character described, the combination of a driving member, a driven member, a shiftable clutch member, a shifting lever operatively connected with said clutch member, a control rod operatively connected with said shifting lever, and a toggle lever, comprising two pivotally connected members, one of said members having pivotal connection with said shifting lever and with a fixed point, the other of said members comprising a sleeve having pivotal and endwise movement relative to a fixed point, and a spring within said sleeve acting to assist the movement of the shifting lever into and from its operative positions and to lock the same in said positions.

8. In a device of the character described, the combination of a driving member, a driven member, a shiftable clutch member provided with a shifting lever, a control rod operatively connected with said shifting lever, a fixed stud, and a toggle lever, comprising pivotally connected members, one of said members being operatively connected with said control rod and provided with a slot engaging said stud, and the other member having pivotal and endwise movement relative to a fixed point, and embracing tension means acting on said last mentioned member of the toggle lever to assist the movement of said shifting lever into its operative positions and to lock the same in said positions.

9. In a device of the character described, the combination of a driving member, a driven member, a shiftable clutch member provided with a shifting lever, a control rod operatively connected with said shifting lever, and a toggle lever, comprising two pivotally connected members provided at their ends with slots, two fixed studs having pivotal and sliding engagement with said slots, one of said members having pivotal connection intermediate its ends with said shifting lever, and the other member consisting of a sleeve and a spring mounted within said sleeve and bearing against the adjacent fixed stud, said spring acting through said toggle lever to assist the movement of said shifting lever into its operative positions and to lock the same in said positions.

10. In a device of the character described, the combination of a driving member, a driven member, a shiftable clutch member provided with a shifting lever, operating means comprising a lever connected with said shifting lever, two fixed studs, and a toggle lever, comprising pivotally connected members, one of said members moving with said lever of the operating means, and provided with a slot engaging one of said studs, the other member being provided at its outer extremity with a slot having sliding and rotative engagement with the other of said studs, and a spring bearing at its ends against said last mentioned member and fixed stud to exert a pressure upon said shifting lever to assist the movement of the same into its operative positions and to lock the same in said positions.

11. In a device of the character described, the combination of a driving member, a driven member, a shiftable clutch member provided with a shifting lever, an endwise movable control rod, a lever connecting said shifting lever and control rod, two fixed studs, and a toggle lever, comprising pivotally connected members, one of said members moving with said lever connecting said control rod and shifting lever, and provided with a slot engaging one of said studs, the other member having the form of a sleeve provided at its outer extremity with a slot having sliding and rotative engagement with the other of said studs, and a spring within said sleeve bearing at its ends upon said sleeve and fixed studs, and acting to exert a pressure upon said shifting lever to assist the movement of the same into its operative positions and to lock the same in said positions.

12. In a device of the character described, the combination of a driving member, a driven member, a shiftable clutch member provided with a shifting lever, a fixed plate provided with upwardly projecting studs, an endwise movable control rod, a lever connecting said shifting lever and control rod, the same having angularly arranged arms, one of said arms being provided with a forked extremity in pivotal engagement with one of said studs, and the other of said arms being connected with said control rod, said lever being pivotally connected with said shifting lever intermediate the extremities of its arms, and a toggle lever, comprising a yoke member pivotally connected with said shifting lever, and a sleeve member pivotally connected with said yoke member and having endwise and rotative movement about the other of said studs, and a spring within said sleeve, acting upon said stud and sleeve to exert a pressure upon said shifting lever to assist the movement of the same into its operative positions and to lock the same in said positions.

13. In a device of the character described, the combination of a driving member, a primary driven member, an intermediate driven member, a shiftable clutch member for alternately engaging said primary and intermediate driven members with said driving member, a control rod operatively connected with said shifting lever, and a toggle lever, embracing tension means acting on said clutch member to assist its movement into its operative positions and to lock the same in said positions.

14. In a device of the character described, the combination of a driving member, a primary driven member, an intermediate driven member, a shiftable clutch member for alternately engaging said primary and intermediate driven members with said driving member, and provided with a shifting lever, a manually operable control rod connected with said shifting lever, and a toggle lever, embracing tension means, acting on said shifting lever to assist its movement into its operative positions and to lock the same in said positions.

15. In a device of the character described, the combination of a driving member, a primary driven member, an intermediate driven member, a shiftable clutch member for alternately engaging said primary and intermediate driven members with said driving member, and provided with a shifting lever, a manually operable control rod, connected with said shifting lever, and a toggle lever, comprising pivoted members, one of said members having pivotal connection with said shifting lever, and the other embracing a spring acting to assist the movement of said shifting lever into its operative positions and to lock the same in said positions.

16. In a device of the character described, the combination of a driving member, a primary driven member, an intermediate driven member, a shiftable clutch member for alternately engaging said primary and intermediate driven members with said driving member, and provided with a shifting lever, a manually operable control rod, a lever connecting said shifting lever and control rod, and a toggle lever, comprising pivoted members, one of said members having pivotal connection with said shifting lever and lever connecting said shifting lever and control rod, and the other embracing a spring acting to assist the movement of said shifting lever into its operative positions and to lock the same in said positions.

In testimony, that I, claim the foregoing as my invention I affix my signature in the presence of two witnesses, this 26th day of July A. D. 1913.

FRANK E. SPERRY.

Witnesses:
R. MOBERG,
WILLIAM OTTANAY.

Copies of this patent may be obtained for five cents each, by addressing the "Commissioner of Patents, Washington, D. C."